(12) United States Patent
Fujii et al.

(10) Patent No.: US 9,287,595 B2
(45) Date of Patent: Mar. 15, 2016

(54) BATTERY COOLING STRUCTURE

(75) Inventors: Ryo Fujii, Wako (JP); Koichi Yamamoto, Wako (JP); Goichi Katayama, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 281 days.

(21) Appl. No.: 13/883,157

(22) PCT Filed: Oct. 13, 2011

(86) PCT No.: PCT/JP2011/073523
§ 371 (c)(1),
(2), (4) Date: Jun. 7, 2013

(87) PCT Pub. No.: WO2012/066874
PCT Pub. Date: May 24, 2012

(65) Prior Publication Data
US 2013/0266840 A1 Oct. 10, 2013

(30) Foreign Application Priority Data
Nov. 16, 2010 (JP) ................................ 2010-255881

(51) Int. Cl.
*H01M 10/50* (2006.01)
*H01M 2/10* (2006.01)
(Continued)

(52) U.S. Cl.
CPC ........ *H01M 10/5016* (2013.01); *H01M 2/1077* (2013.01); *H01M 10/60* (2015.04);
(Continued)

(58) Field of Classification Search
CPC ........ H01M 10/50; H01M 10/60; B60K 1/04; B60K 2001/005

USPC .................................................. 429/120, 100
See application file for complete search history.

(56) References Cited

U.S. PATENT DOCUMENTS 7,678,494 B2* 3/2010 Tsuchiya ...................... 429/120
2005/0205730 A1 9/2005 Carnevali
(Continued)

FOREIGN PATENT DOCUMENTS

| JP | 2006-092805 A | 4/2006 |
| JP | 2008-105645 A | 5/2008 |
| JP | 2008-140631 A | 6/2008 |
| JP | 2009-238644 A | 10/2009 |

(Continued)

OTHER PUBLICATIONS

Intenational Search Report for PCT/JP2011/073523, Maling Date of Jan. 10, 2012.

*Primary Examiner* — Patrick Ryan
*Assistant Examiner* — Julian Anthony
(74) *Attorney, Agent, or Firm* — Westerman, Hattori, Daniels & Adrian, LLP

(57) ABSTRACT

A battery cooling structure is provided in which since a battery support member (43) that is disposed above a lower layer battery group (B4, B5) and supports an upper layer battery group (B6) on its upper face is formed so as to be hollow, and the upper layer battery group (B6) is cooled by a cooling medium that flows in an interior of the battery support member (43), due to the battery support member (43) having the dual function of supporting the upper layer battery group (B6) and cooling the upper layer battery group (B6), it is possible to cut the number of components and simplify the structure. Moreover, since the cooling medium flows in the interior of the battery support member (43) and does not come into direct contact with the upper layer battery group (B6), the upper layer battery group (B6) is not contaminated by the cooling medium.

9 Claims, 13 Drawing Sheets

(51) Int. Cl.
*H01M 10/625* (2014.01)
*H01M 10/60* (2014.01)
*H01M 10/6563* (2014.01)
*H01M 10/647* (2014.01)
*H01M 10/613* (2014.01)

(52) U.S. Cl.
CPC .......... *H01M10/613* (2015.04); *H01M 10/625* (2015.04); *H01M 10/647* (2015.04); *H01M 10/6563* (2015.04)

(56) References Cited

U.S. PATENT DOCUMENTS

2006/0096794 A1\* 5/2006 Yoshida .................. 180/65.1
2010/0116570 A1  5/2010 Sugawara et al.

FOREIGN PATENT DOCUMENTS

JP    2010-015931 A    1/2010
JP    2010-113999 A    5/2010

\* cited by examiner

FIG. 4
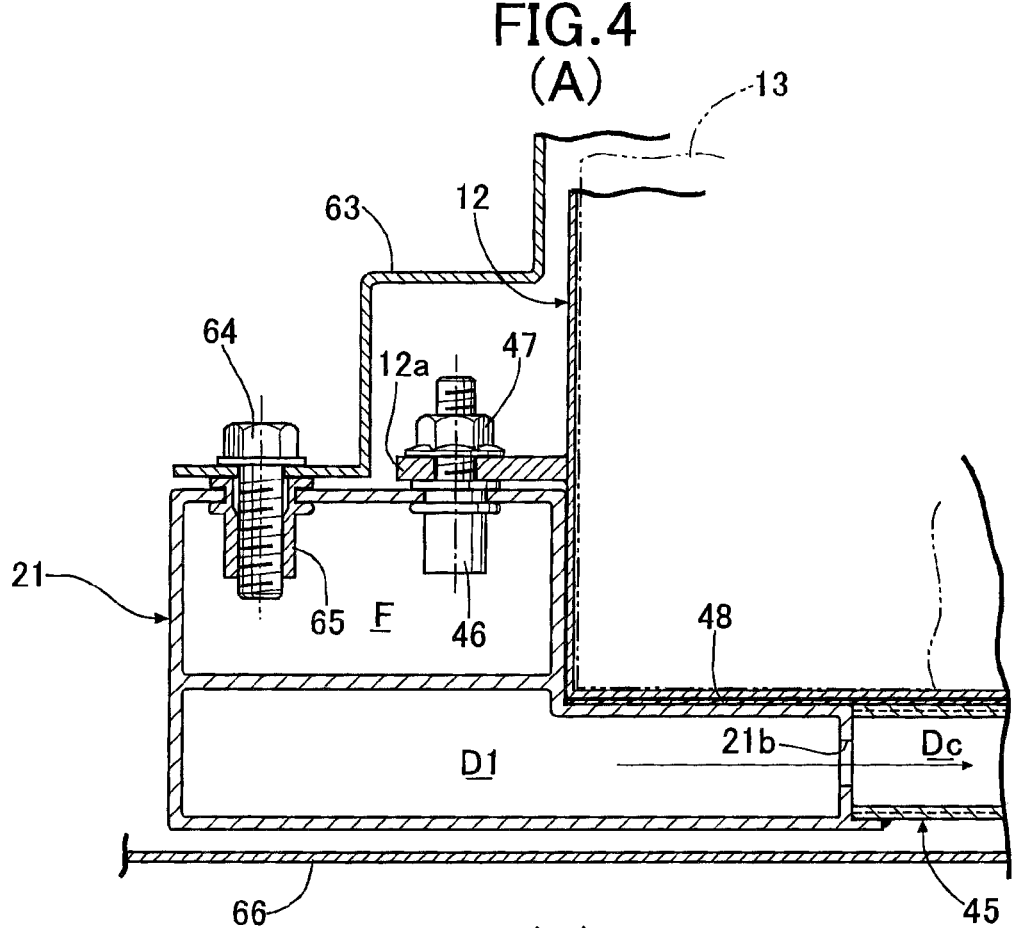
(A)
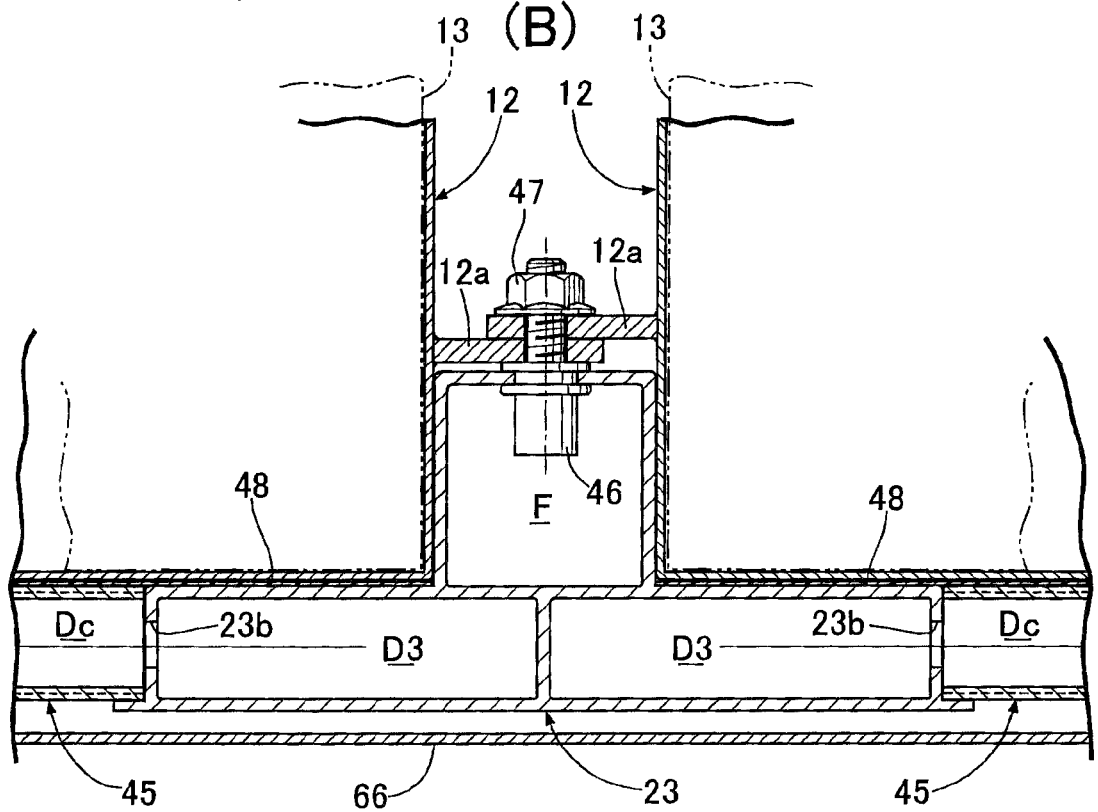
(B)

BATTERY COOLING STRUCTURE

TECHNICAL FIELD

The present invention relates to a battery cooling structure in which a battery support member is disposed above a lower layer battery group, an upper layer battery group is supported on an upper face of the battery support member, and the lower layer battery group and the upper layer battery group are cooled by the flow of a cooling medium.

BACKGROUND ART

An arrangement in which upper and lower battery modules having a plurality of battery cells housed in the interior of a module case are stacked, and the battery modules are cooled by making air drawn in by means of a blower flow from an intake opening at one end of each of the upper and lower module cases to a discharge opening at the other end is known from Patent Document 1 below.

RELATED ART DOCUMENTS

Patent Documents

Patent Document 1: Japanese Patent Application Laid-open No. 2010-15931

SUMMARY OF THE INVENTION

Problems to be Solved by the Invention

In the invention described in Patent Document 1 above, in order to prevent the lower battery module from being crushed by the weight of the upper battery module, a plurality of columns for reinforcement (see FIG. 7 and FIG. 11) are provided on a side face of a battery case of the lower battery module, but there is the problem that the number of components increases by a portion corresponding to the columns and the structure becomes complicated. Moreover, since cooling air flows through a cooling passage formed in the interior of the battery case, when outside air is used as the cooling air, there is a possibility that the battery cells housed in the battery case will become contaminated.

The present invention has been accomplished in light of the above-mentioned circumstances, and it is an object thereof to enable an upper layer battery group supported above a lower layer battery group to be cooled while minimizing any increase in the number of components and preventing contamination from a cooling medium.

Means for Solving the Problems

In order to attain the above object, according to a first aspect, there is provided a battery cooling structure in which a battery support member is disposed above a lower layer battery group, an upper layer battery group is supported on an upper face of the battery support member, and the lower layer battery group and the upper layer battery group are cooled by the flow of a cooling medium, wherein the battery support member is formed so as to be hollow, and the upper layer battery group is cooled by a cooling medium that flows in an interior of the battery support member.

Further, according to a second aspect of the present invention, in addition to the first aspect, the interior of the battery support member is divided into a plurality of flow paths by means of a partition wall extending in the direction of flow of the cooling medium.

Furthermore, according to a third aspect of the present invention, in addition to the first or second aspect, the battery cooling structure comprises an electronic component support member disposed adjacent to the battery support member, the electronic component support member comprises a support part that supports an electronic component and a support leg that extends downward from the support part and is fixed to a fixing part, and the support part is fixed to the battery support member.

Moreover, according to a fourth aspect of the present invention, in addition to the third aspect, the support leg is provided on one end side and the other end side, in a vehicle width direction, of the electronic component support member, a mounting bracket provided at a lower end of the support leg on the one end side in the vehicle width direction extends toward a front of a vehicle body, and a mounting bracket provided at a lower end of the support leg on the other end side in the vehicle width direction extends toward a rear of the vehicle body.

Further, according to a fifth aspect of the present invention in addition to the fourth aspect, the support leg on the one end side in the vehicle width direction has a lower part thereof bending toward the front of the vehicle body relative to an upper part thereof.

It should be noted here that fourth and fifth battery groups B4 and B5 of an embodiment correspond to the lower layer battery group of the present invention, a sixth battery group B6 of the embodiment corresponds to the upper layer battery group of the present invention, a tenth duct D10 of the embodiment corresponds to the flow path of the present invention, eighth and ninth longitudinal frame members 28 and 29 of the embodiment correspond to the fixing part of the present invention, a heat exchange panel 43 of the embodiment corresponds to the battery support member of the present invention, a power switch support platform 51 of the embodiment corresponds to the electronic component support member of the present invention, a support frame 51a of the embodiment corresponds to the support part of the present invention, and a power switch 52 of the embodiment corresponds to the electronic component of the present invention.

Effects of the Invention

In accordance with the first aspect of the present invention, since the battery support member that is disposed above the lower layer battery group and supports the upper layer battery group on its upper face is formed so as to be hollow, and the upper layer battery group is cooled by the cooling medium that flows in the interior of the battery support member, due to the battery support member having the dual function of supporting the upper layer battery group and cooling the upper layer battery group, it is possible to cut the number of components and simplify the structure. Moreover, since the cooling medium flows in the interior of the battery support member and does not come into direct contact with the upper layer battery group, the upper layer battery group is not contaminated by the cooling medium.

Furthermore, in accordance with the second aspect of the present invention, since the interior of the battery support member is divided into a plurality of flow paths by means of the partition wall extending in the direction of flow of the cooling medium, it is possible not only to prevent the battery support member from being crushed by the weight of the upper layer battery group to thus ensure a flow path for the cooling medium, but also to straighten the flow of the cooling medium flowing in the interior of the battery support member by means of the partition wall to thus reduce the flow resistance.

Moreover, in accordance with the third aspect of the present invention, since the electronic component support member disposed adjacent to the battery support member is formed from the support part supporting an electronic component and the support leg extending downward from the support part and fixed to the fixing part, and the support part is fixed to the battery support member, it is possible to prevent the battery support member from collapsing by utilizing the electronic component support member without adding a special member.

Furthermore, in accordance with the fourth aspect of the present invention, since, among the support legs provided on one end side and the other end side, in the vehicle width direction, of the electronic component support member, the mounting bracket provided at the lower end of the support leg on the one end side in the vehicle width direction extends toward the front of the vehicle body, and the mounting bracket provided at the lower end of the support leg on the other end side in the vehicle width direction extends toward the rear of the vehicle body, even if an inertial force in the vehicle body fore-and-aft direction acts on the upper layer battery group, which has a large weight, due to sudden braking or sudden starting of the vehicle, it is possible to support effectively the inertial force by means of the electronic component support member, thus preventing the battery support member from collapsing.

Moreover, in accordance with the fifth aspect of the present invention, since the support leg on one end side in the vehicle width direction has its lower part bending toward the front of the vehicle body relative to the upper part, even if a large inertial force toward the front of the vehicle body acts on the upper layer battery group, which has a large weight, when the vehicle undergoes sudden braking, it is possible to support more effectively the inertial force by means of the electronic component support member, thus reliably preventing the battery support member from collapsing.

BRIEF DESCRIPTION OF DRAWINGS

FIGS. 4A and 4B are sectional view along line 4A-4A and a sectional view along line 4B-4B in FIG. 3. (first embodiment)

EXPLANATION OF REFERENCE NUMERALS AND SYMBOLS

Figure 1:
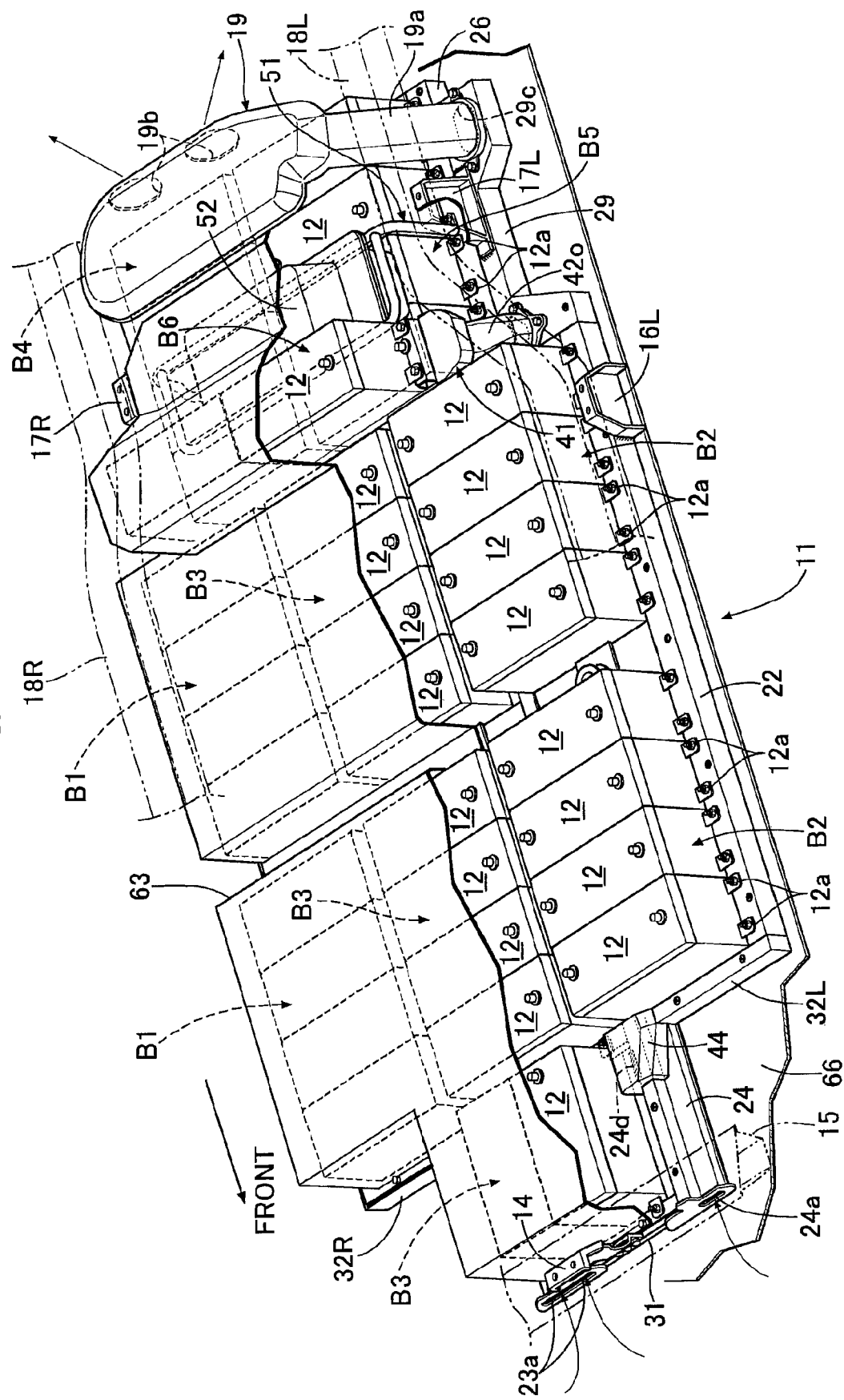
FIG. 1 is a perspective view of a battery unit of an electric automobile. (first embodiment)

B4 Fourth battery group (lower layer battery group)
B5 Fifth battery group (lower layer battery group)
B6 Sixth battery group (upper layer battery group)
D10 Tenth duct (flow path)
28 Eighth longitudinal frame member (fixing part)
29 Ninth longitudinal frame member (fixing part)
43 Heat exchange panel (battery support member)
43a Partition wall
51 Power switch support platform (electronic component support member)
51a Support frame (support portion)
51b Support leg
51c Support leg
51e Mounting bracket
51f Mounting bracket
52 Power switch (electronic component)

MODE FOR CARRYING OUT THE INVENTION

A mode for carrying out the present invention is explained below by reference to FIG. 1 to FIG. 13.

First Embodiment

Figure 2:
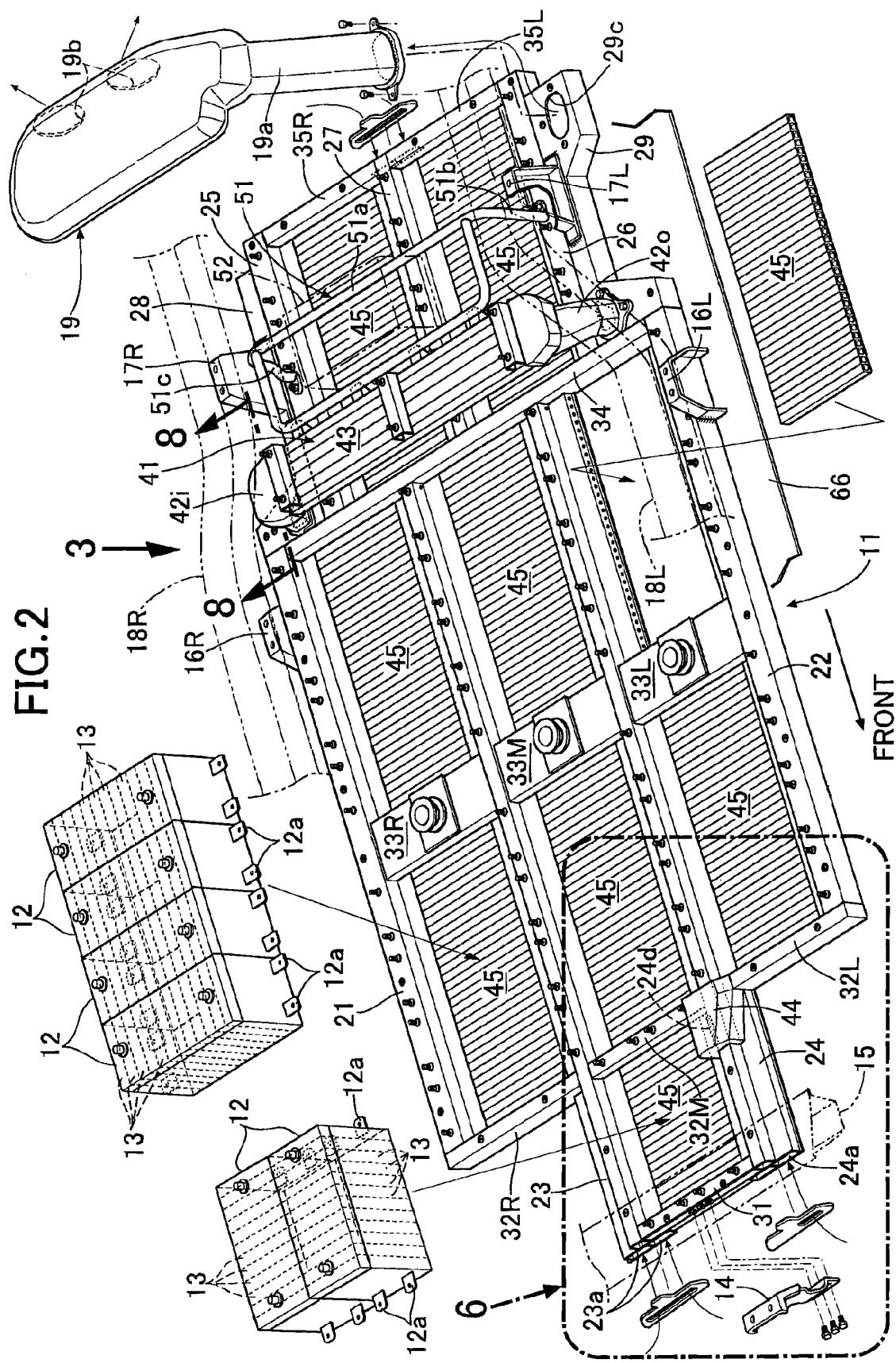
FIG. 2 is a diagram showing a state in which a battery module is removed from FIG. 1. (first embodiment)
Figure 3:
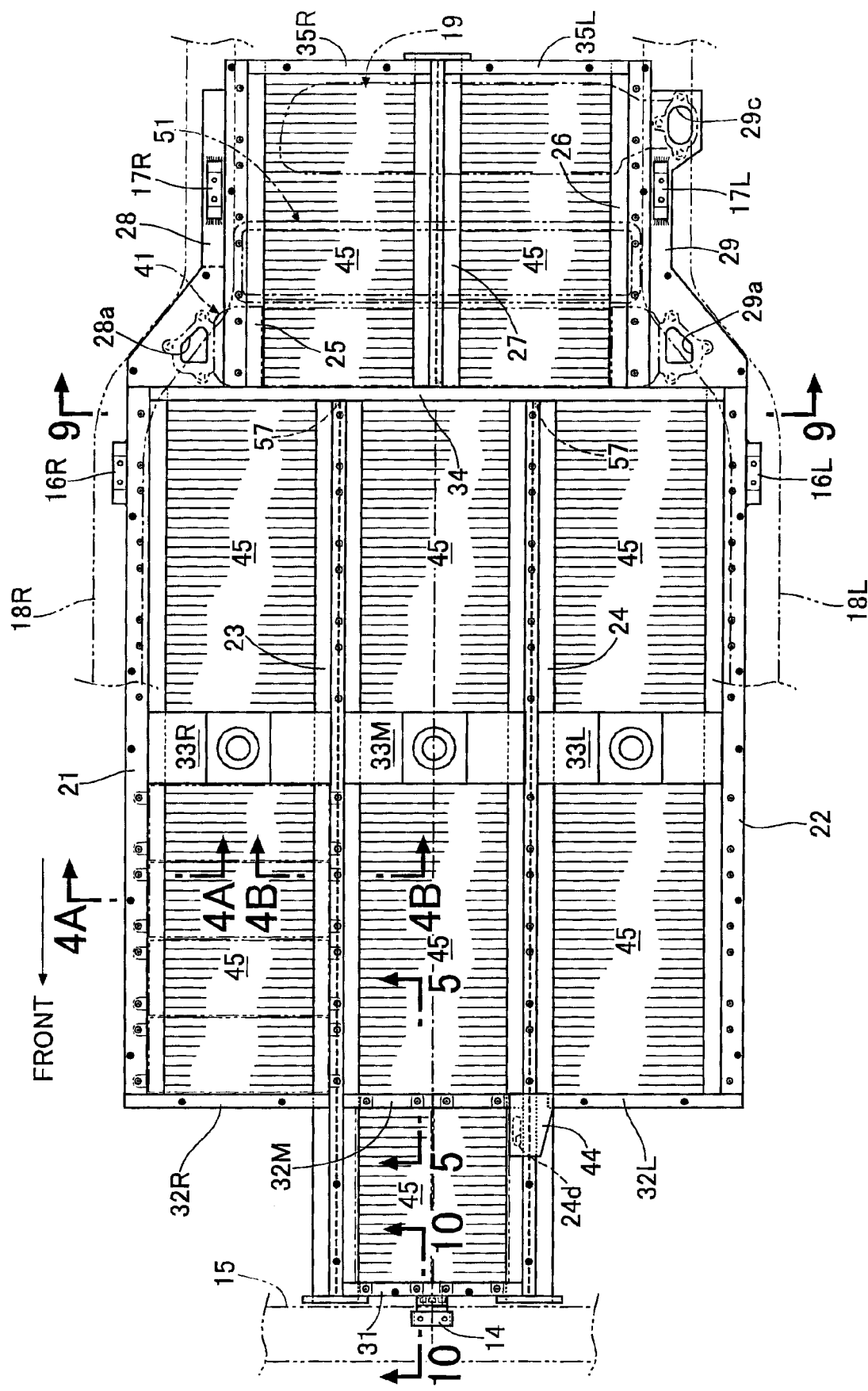
FIG. 3 is a view from the direction of arrow 3 in FIG. 2. (first embodiment)

As shown in FIG. 1 to FIG. 3, a battery unit for supplying electrical power to a motor/generator, which is a power source for making an electric automobile travel, is formed from a flat-shaped tray 11 and a plurality of battery modules 12 placed on a floor face of the tray 11. Each battery module 12 has a rectangular parallelepiped shape, and a plurality of battery cells 13 electrically connected in series are housed in an interior of the battery module 12 (see FIG. 2). Two brackets 12a and 12a are projectingly provided on each of faces at opposite ends in the lengthwise direction of the battery module 12 in order to fix the battery module 12 to the tray 11.

Joining a mounting bracket 14 provided on a front part of the tray 11 to a cross member 15 of a vehicle body, joining two mounting brackets 16L and 17L provided on a left rear part of the tray 11 to a left-hand side frame 18L, and joining two mounting brackets 16R and 17R provided on a right rear part of the tray 11 to a right-hand side frame 18R enables the battery unit to be suspendingly supported on the vehicle body. A fan unit 19 housing an electric fan (not illustrated) in the interior is provided in a rear end part of the tray 11; when outside air drawn in by this fan unit 19 flows in the interior of the tray 11, it undergoes heat exchange with the battery modules 12 placed on the floor face thereof, thus cooling the battery modules 12.

The tray 11 includes a first longitudinal frame member 21, a second longitudinal frame member 22, a third longitudinal frame member 23, and a fourth longitudinal frame member 24, which extend in parallel to each other along the fore-and-aft direction of the vehicle body. The first longitudinal frame member 21 is disposed on the right-hand side in the vehicle width direction, the second longitudinal frame member 22 is disposed on the left-hand side in the vehicle width direction, the third longitudinal frame member 23 is disposed on the inside in the vehicle width direction of the first longitudinal frame member 21, and the fourth longitudinal frame member 24 is disposed on the inside in the vehicle width direction of the second longitudinal frame member 22.

The tray 11 includes a fifth longitudinal frame member 25, a sixth longitudinal frame member 26, and a seventh longitudinal frame member 27, which extend in parallel to each other in the fore-and-aft direction of the vehicle body to the rear of the first to fourth longitudinal frame members 21 to 24. The fifth longitudinal frame member 25 is disposed on the right-hand side in the vehicle width direction, the sixth longitudinal frame member 26 is disposed on the left-hand side in the vehicle width direction, and the seventh longitudinal frame member 27 is disposed in the middle of the vehicle body. An eighth longitudinal frame member 28 is connected in parallel to the outside, in the vehicle width direction, of the fifth longitudinal frame member 25, and a ninth longitudinal frame member 29 is connected in parallel to the outside, in the vehicle width direction, of the seventh longitudinal frame member 27.

A first transverse frame member 31 extending in the vehicle width direction is connected between front ends of the third and fourth longitudinal frame members 23 and 24. A section between front ends of the first and second longitudinal frame members 21 and 22 is divided into three, and second transverse frame members 32L, 32M, and 32R extending in the vehicle width direction are connected thereto. The fourth longitudinal frame member 24 is sandwiched between the left-hand and middle second transverse frame members 32L and 32M, and the third longitudinal frame member 23 is sandwiched between the middle and right-hand second transverse frames members 32M and 32R. A section between intermediate parts, in the fore-and-aft direction, of the first and second longitudinal frame members 21 and 22 is divided into three, and third transverse frame members 33L, 33M, and 33R extending in the vehicle width direction are connected thereto. The fourth longitudinal frame member 24 is sandwiched between the left-hand and middle third transverse frame members 33L and 33M, and the third longitudinal frame member 23 is sandwiched between the middle and right-hand third transverse frame members 33M and 33R.

A fourth transverse frame member 34 extending in the vehicle width direction is connected to rear ends of the first to fourth longitudinal frame members 21 to 24. Front ends of the fifth to seventh longitudinal frame members 25 to 27 are connected to the fourth transverse frame member 34, a section between rear ends of the fifth to seventh longitudinal frame members 25 to 27 is divided into two, and fifth transverse frame members 35L and 35R extending in the vehicle width direction are connected thereto.

An inlet-side leg portion 42i and an outlet-side leg portion 42o are standingly provided on front ends of the eighth longitudinal frame member 28 and the ninth longitudinal frame member 29 respectively, and a rectangular plate-shaped heat exchange panel 43 extends in the vehicle width direction so as to provide a bridge between upper ends of the inlet-side leg portion 42i and the outlet-side leg portion 42o.

The mounting bracket 14 is fixed to a front face of the first transverse frame member 31, the mounting brackets 16L and 16R are fixed to outer faces of the first and second longitudinal frame members 21 and 22 respectively, and the mounting brackets 17L and 17R are fixed to upper faces of the eighth and ninth longitudinal frame members 28 and 29 respectively.

An inlet duct 19a of the fan unit 19 is fixed to an opening 29c formed in a rear upper face of the ninth longitudinal frame member 29, and two discharge openings 19b and 19b of the fan unit 19 open so as to face the rear on the left and right of the vehicle body.

A flow path for air as a cooling medium flowing in the interior of the tray 11 is now explained. The overall structure of the flow path for air is schematically shown in FIG. 12.

Figure 12:
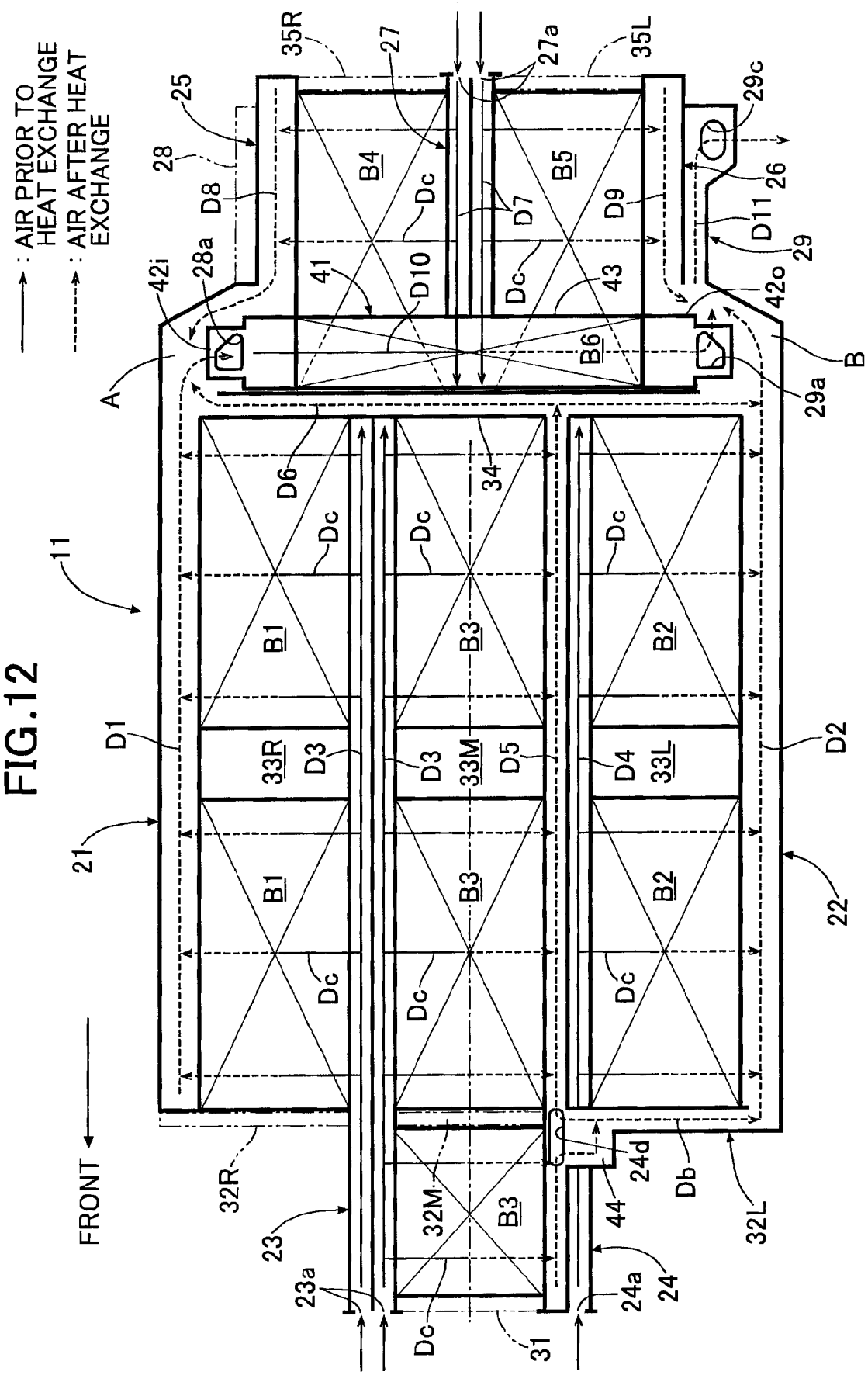
FIG. 12 is a schematic diagram for explaining a flow path for cooling air. (first embodiment)

As shown in FIG. 3 and FIG. 12, the first longitudinal frame member 21, the second longitudinal frame member 22, the fifth longitudinal frame member 25, and the sixth longitudinal frame member 26 are all formed from extruded materials having the same cross-sectional shape. As shown in FIG. 4 (A), the cross section of the first longitudinal frame member 21 is an 'L' shape, and an upper hollow frame F and a lower first duct D1 are formed as a unit. The second longitudinal frame member 22, the fifth longitudinal frame member 25, and the sixth longitudinal frame member 26, which have the same cross-sectional shape as above, include a second duct D2, an eighth duct D8, and a ninth duct D9 respectively beneath the hollow frame F. Furthermore, an eleventh duct D11 is formed in the interior of the ninth longitudinal frame member 29.

As shown in FIG. 3 and FIG. 12, the third longitudinal frame member 23, the fourth longitudinal frame member 24, and the seventh longitudinal frame member 27 are all formed from extruded materials having the same cross-sectional shape. As shown in FIG. 4 (B), the third longitudinal frame member 23 has an 'inverted T'-shaped cross section, and a hollow frame F on the upper side and a pair of third ducts D3 and D3 connectedly provided in the vehicle width direction on the lower side are formed as a unit. The fourth longitudinal frame member 24, which has the same cross-sectional shape as above, integrally includes a fourth duct D4 on the left-hand side in the vehicle width direction and a fifth duct D5 on the right-hand side in the vehicle width direction beneath the hollow frame F. The seventh longitudinal frame member 27, which has the same cross-sectional shape as above, integrally includes a pair of left and right seventh ducts D7 and D7 beneath the hollow frame F.

Figure 5:
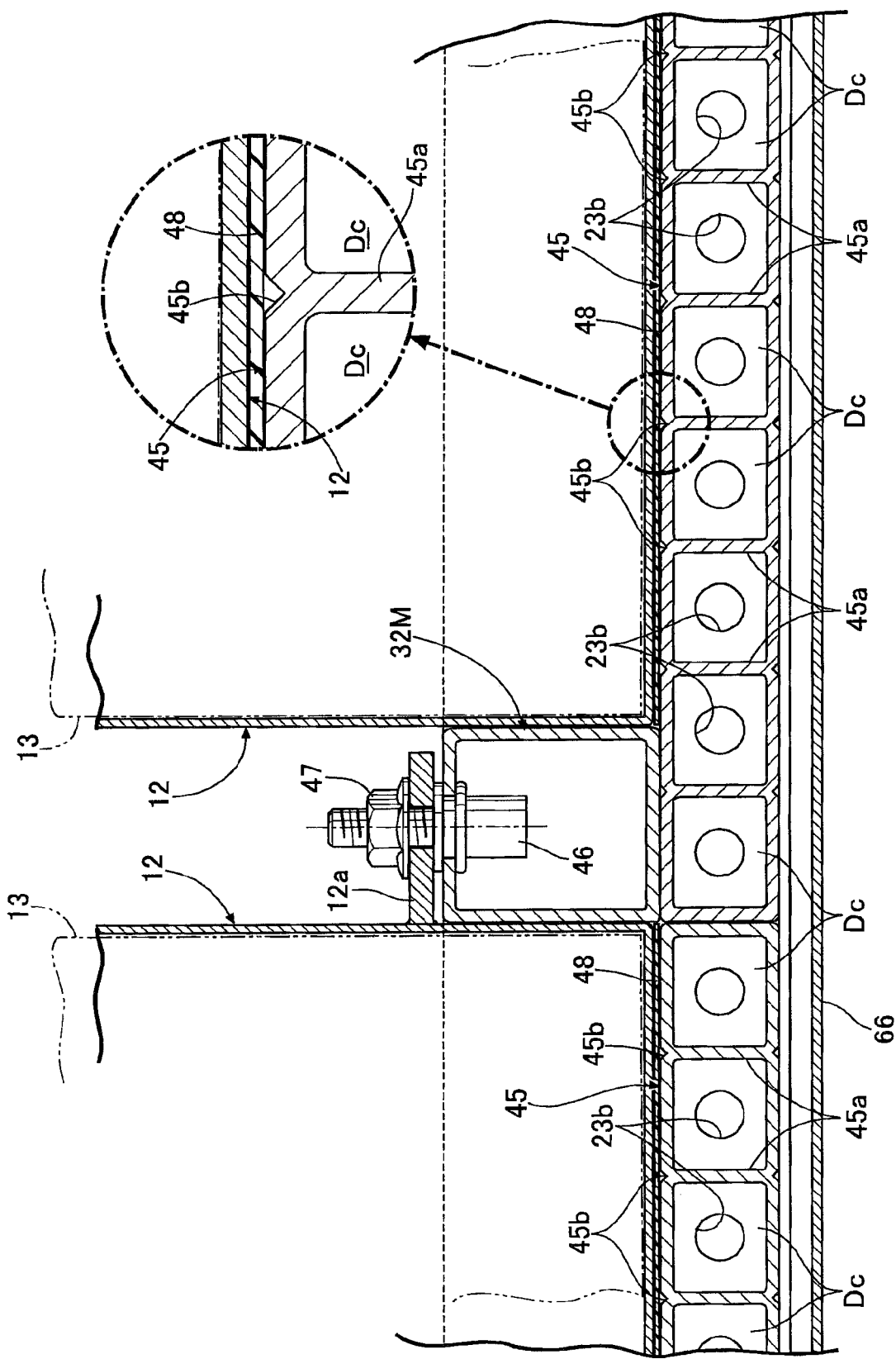
FIG. 5 is a sectional view along line 5-5 in FIG. 3. (first embodiment)

As shown in FIG. 3, FIG. 5, and FIG. 12, the first transverse frame member 31, the second transverse frame members 32L, 32M, and 32R, the fourth transverse frame member 34, and the fifth transverse frame members 35L and 35R are all formed from extruded materials having a 'square'-shaped cross section. The left-hand second transverse frame member 32L forms a bypass duct Db (see FIG. 6); the left end of the bypass duct Db is connected to the front end of the second duct D2, and the right end of the bypass duct Db is connected to an opening 24d in an upper face of the fifth duct D5 (see FIG. 6) via a flow path-forming member 44 covering an upper face of the fourth longitudinal frame member 24.

A heat insulating material such as a foamed material may be provided between the flow path-forming member 44 and the fourth duct D4, and the heat insulating material may be provided with a flow-straightening function such as asperities extending from the opening 24d on the upper face toward the bypass duct Db. This enables heat exchange between low temperature air flowing in the fourth duct D4 and high temperature air discharged into the bypass duct Db to be prevented.

Furthermore, the interior of the fourth transverse frame member 34 forms a sixth duct D6, and rear ends of the first and second ducts D1 and D2, the rear end of the fifth duct D5, front ends of the eighth and ninth ducts D8 and D9, and the front end of the eleventh duct D11 are connected to the sixth duct D6. The middle second transverse frame member 32M, the right-hand second transverse frame member 32R, the third transverse frame members 33L, 33M, and 33R, and the fifth transverse frame members 35L and 35R do not function as a flow path for air.

The rear end of the first duct Dl, the front end of the eighth duct D8, and the right end of the sixth duct D6 are gathered together in a first gathering area A in a front part of the eighth longitudinal frame member 28 (see FIG. 12), and the rear end of the second duct D2, the front end of the ninth duct D9, the front end of the eleventh duct D11, and the left end of the sixth duct D6 are gathered together in a second gathering area B in a front part of the ninth longitudinal frame member 29 (see FIG. 12). As shown in FIG. 2 and FIG. 3, the inlet-side leg portion 42i of a battery module support platform 41 is connected to an opening 28a above the first gathering area A, and the outlet-side leg portion 42o of the battery module support platform 41 is connected to an opening 29a above the second gathering area B. The rectangular plate-shaped heat exchange panel 43 extends in the vehicle width direction so as to provide a bridge between upper ends of the inlet-side leg portion 42i and the outlet-side leg portion 42o, and tenth ducts D10 are formed in the interior of the heat exchange panel 43.

Intake openings 23a and 23a are formed at front ends of the pair of third ducts D3 and D3 of the third longitudinal frame member 23, an intake opening 24a is formed at the front end of the fourth duct D4 of the fourth longitudinal frame member 24, and intake openings 27a and 27a are formed at rear ends of the pair of seventh ducts D7 and D7 of the seventh longitudinal frame member 27.

The third longitudinal frame member 23 and the first longitudinal frame member 21 are connected via two heat exchange panels 45 and 45, the fourth longitudinal frame member 24 and the second longitudinal frame member 22 are connected via two heat exchange panels 45 and 45, the third longitudinal frame member 23 and the fourth longitudinal frame member 24 are connected via three heat exchange panels 45, the seventh longitudinal frame member 27 and the fifth longitudinal frame member 25 are connected via a heat exchange panel 45, and the seventh longitudinal frame member 27 and the sixth longitudinal frame member 26 are connected via a heat exchange panel 45.

As shown in FIG. 5, a large number of linking ducts Dc are formed in the interior of each heat exchange panel 45 from a large number of partition walls 45a extending along the direction of flow of air. A large number of communication holes 21b to 27b are formed in side faces of the first to seventh longitudinal frame members 21 to 27, and internal spaces of the first to seventh longitudinal frame members 21 to 27 communicate with internal spaces of the linking ducts Dc via the communication holes 21b to 27b.

As shown in FIG. 1 and FIG. 4, two or four battery modules 12 are supported on an upper face of each heat exchange panel 45, and four brackets 12a of each battery module 12 are fixed to the first to seventh longitudinal frame members 21 to 27 and the first and second transverse frame members 31 and 32M by means of bolts 46 and nuts 47. In this arrangement, as shown in FIG. 4 and FIG. 5, a silicon sheet 48, which has high heat conductivity, is sandwiched between a lower face of the battery module 12 and an upper face of the heat exchange panel 45, and a large number of air vent channels 45b extending in parallel to each other are formed on the upper face of the heat exchange panel 45.

As shown in FIG. 1 and FIG. 12, the eight battery modules 12 disposed between the first and third longitudinal frame members 21 and 23 form a first battery group B1, the eight battery modules 12 disposed between the second and fourth longitudinal frame members 22 and 24 form a second battery group B2, the ten battery modules 12 disposed between the third and fourth longitudinal frame members 23 and 24 form a third battery group B3, the three battery modules 12 disposed between the fifth and seventh longitudinal frame member 25 and 27 form a fourth battery group B4, the three battery modules 12 disposed between the sixth and seventh longitudinal frame members 26 and 27 form a fifth battery group B5, and the two battery modules 12 and 12 disposed on the battery module support platform 41 form a sixth battery group B6.

Figure 7:
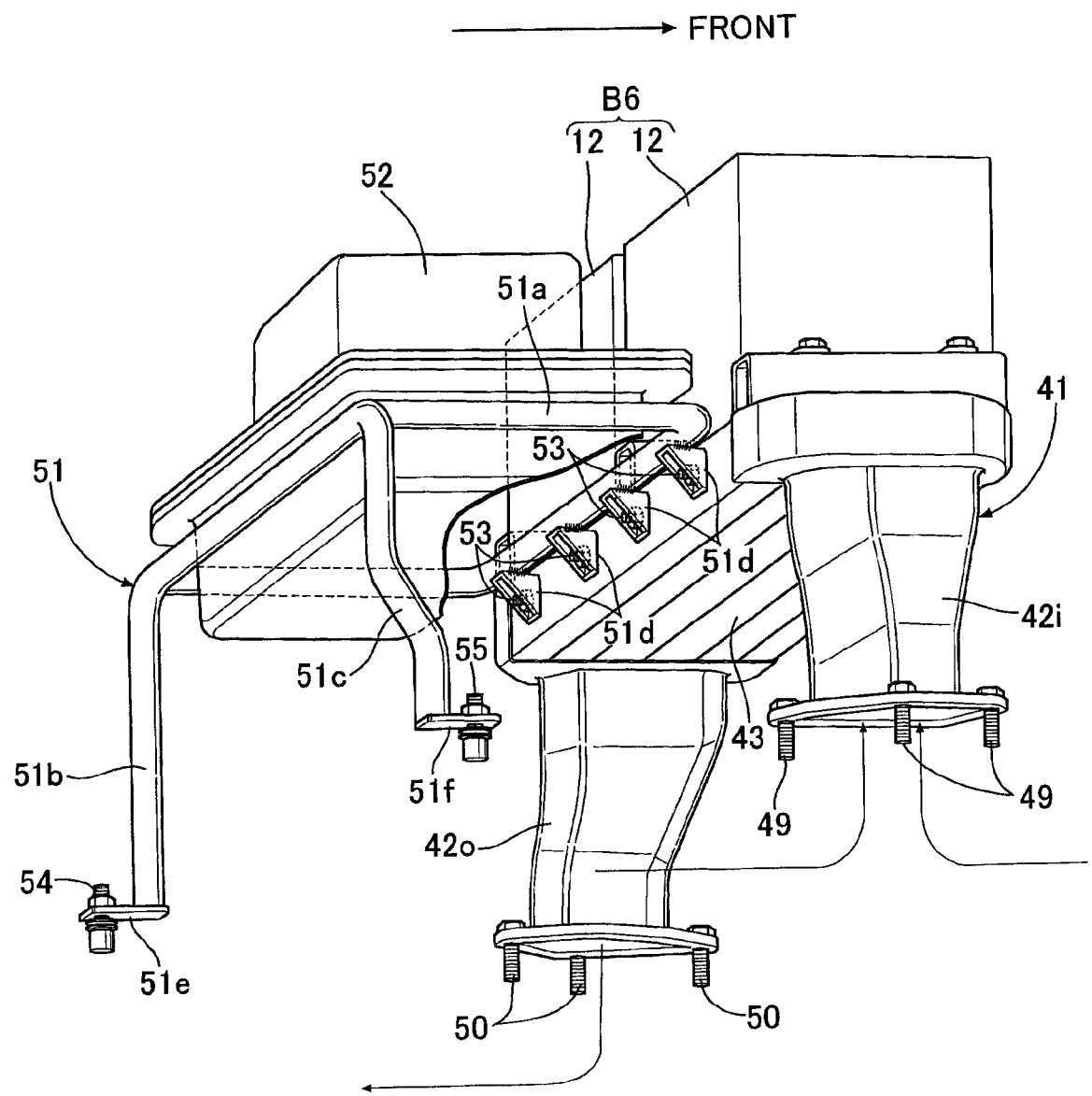
FIG. 7 is a perspective view of a battery module support platform and a power switch support platform. (first embodiment)
Figure 8:
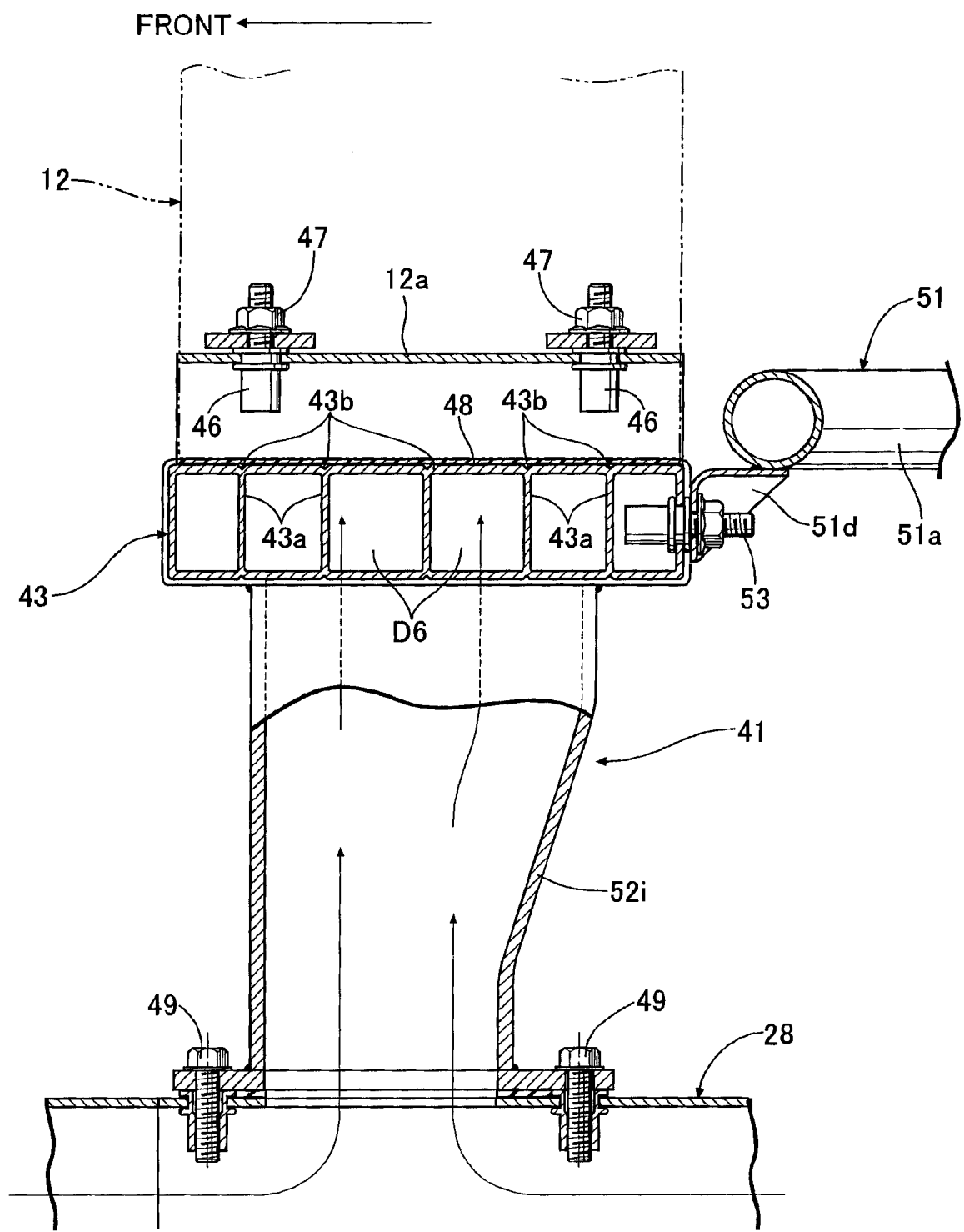
FIG. 8 is a sectional view along line 8-8 in FIG. 2. (first embodiment)

As shown in FIG. 2, FIG. 7, and FIG. 8, the battery module support platform 41 includes the inlet-side leg portion 42i and the outlet-side leg portion 42o, which are formed so as to be hollow, and includes the plate-shaped heat exchange panel 43 that provides a bridge between the inlet-side leg portion 42i and the outlet-side leg portion 42o. The inlet-side leg portion 42i is fixed by means of bolts 49 so as to cover the opening 28a formed in the front upper face of the eighth longitudinal frame member 28 (see FIG. 3), and the outlet-side leg portion 42o is fixed by means of bolts 50 so as to cover the opening 29a formed in the front upper face of the ninth longitudinal frame member 29 (see FIG. 3). In the interior of the heat exchange panel 43, the plurality of tenth ducts D10 are defined by means of a plurality of partition walls 43a extending in the direction of flow of air. Air vent channels 43b are formed on the upper face of the heat exchange panel 43, and two battery modules 12 and 12, which form the sixth battery group B6, are placed on the upper face with a silicon sheet 48 interposed therebetween.

Provided to the rear of the battery module support platform 41 is a power switch support platform 51 formed from a bent metal pipe. The power switch support platform 51 includes a rectangular support frame 51a supporting a power switch 52, and a pair of left and right support legs 51b and 51c extending downward from left and right rear ends of the support frame 51a. A plurality of brackets 51d provided at the front edge of the support frame 51a are fixed to the rear edge of the heat exchange panel 43 by means of bolts 53, a mounting bracket 51e provided at the lower end of the left-hand support leg 51b is fixed to the upper face of the ninth longitudinal frame member 29 by means of a bolt 54, and a mounting bracket 51f provided at the lower end of the right-hand support leg 51c is fixed to the upper face of the eighth longitudinal frame member 28 by means of a bolt 55. The mounting bracket 51f may be fixed to the bolt 46 for retaining the battery module 12 by tightening together with the battery module 12.

The mounting bracket 51e at the lower end of the left-hand support leg 51b extending linearly downward bends at right angles toward the rear of the vehicle body On the other hand, the mounting bracket 51f at the lower end of the right-hand support leg 51c extending downward while curving toward the front of the vehicle body bends at right angles toward the front of the vehicle body.

Figure 9:
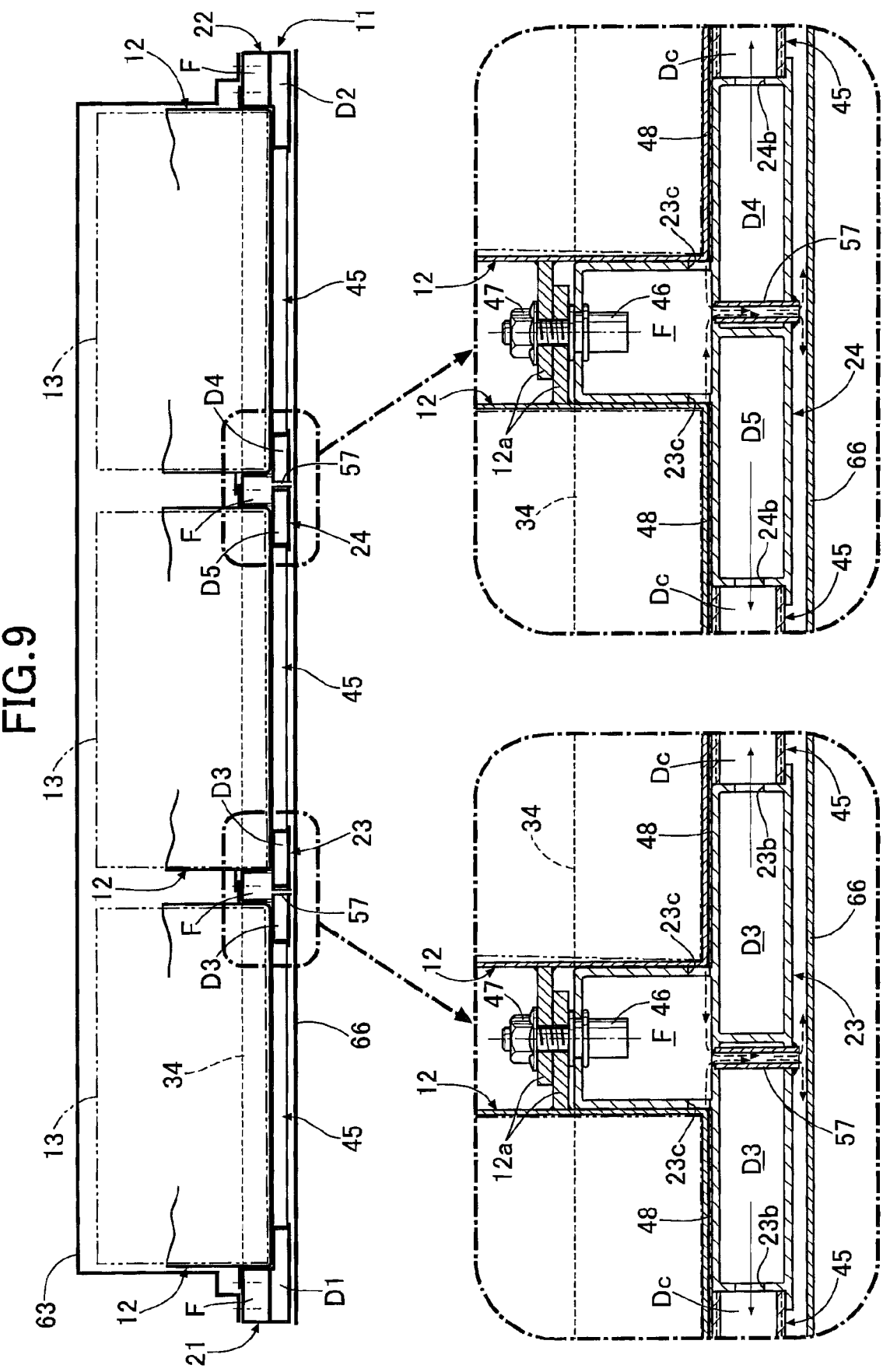
FIG. 9 is a sectional view along line 9-9 in FIG. 3. (first embodiment)

As shown in FIG. 9, drain holes 23c and drain holes 24c facing the upper face of the heat exchange panels 45 are formed in left and right side faces of the hollow frames F and F of the third and fourth longitudinal frame members 23 and 24. With regard to the drain holes 23c and drain holes 24c, a plurality thereof are formed at predetermined intervals along the lengthwise direction of the third and fourth longitudinal frame members 23 and 24, and the interior and the exterior of the hollow frames F and F of the third and fourth longitudinal frame members 23 and 24 communicate with each other via the drain holes 23c and the drain holes 24c.

Furthermore, a drain pipe 57 extending vertically through the third duct D3 is provided in a rear end part of the third longitudinal frame member 23, and a drain pipe 57 extending vertically through the fourth duct D4 is provided in a rear end part of the fourth longitudinal frame member 24. Upper ends of the drain pipes 57 and 57 are press-fitted into upper walls of the third and fourth ducts D3 and D4, and lower ends are welded to lower walls of the third and fourth ducts D3 and D4.

These drain pipes 57 and 57 allow the internal space of the hollow frames F and F of the third and fourth longitudinal frame members 23 and 24 to communicate with the external space beneath the third and fourth ducts D3 and D4.

Figure 6:
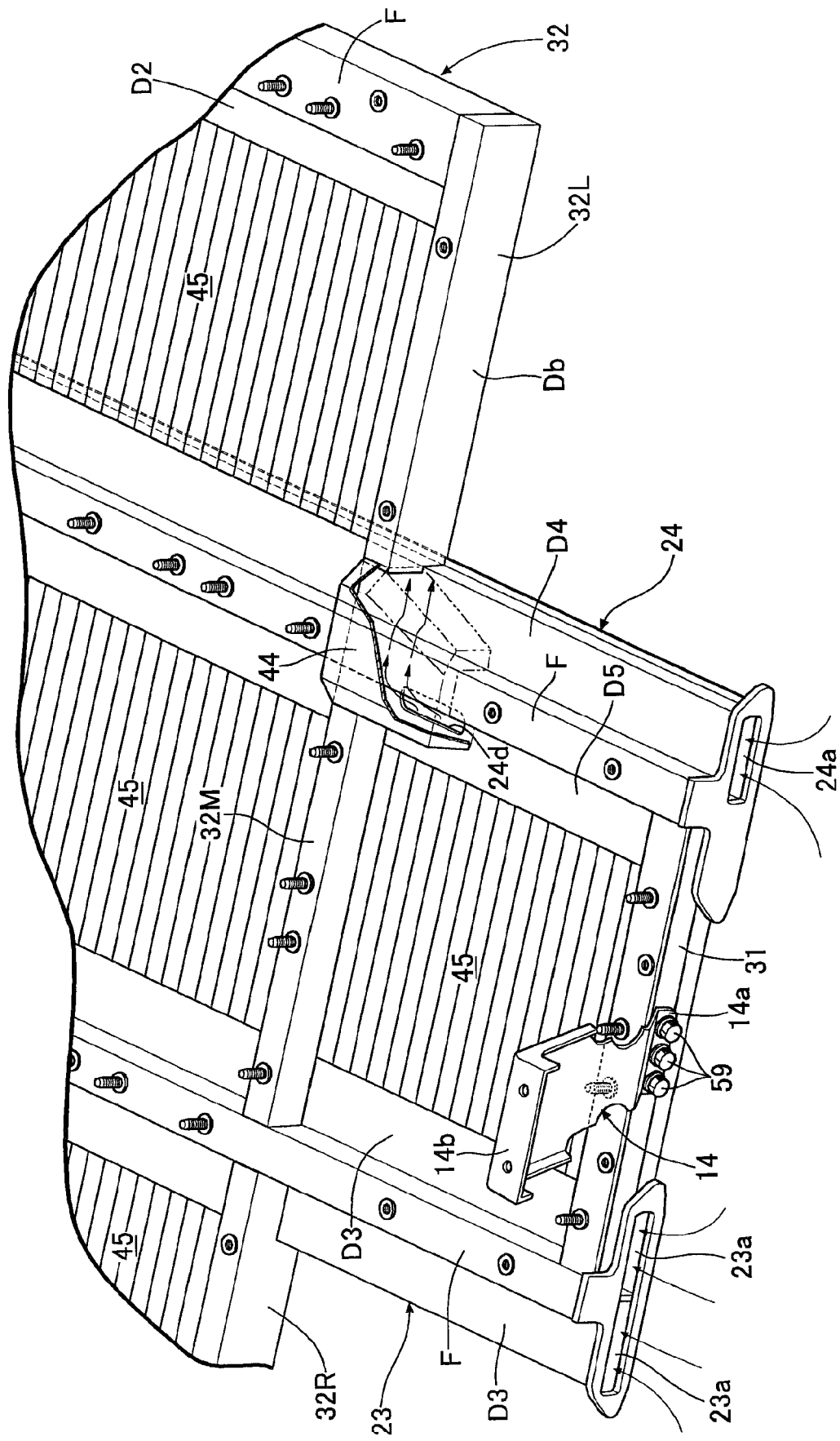
FIG. 6 is an enlarged view of part 6 in FIG. 2. (first embodiment)
Figure 10:
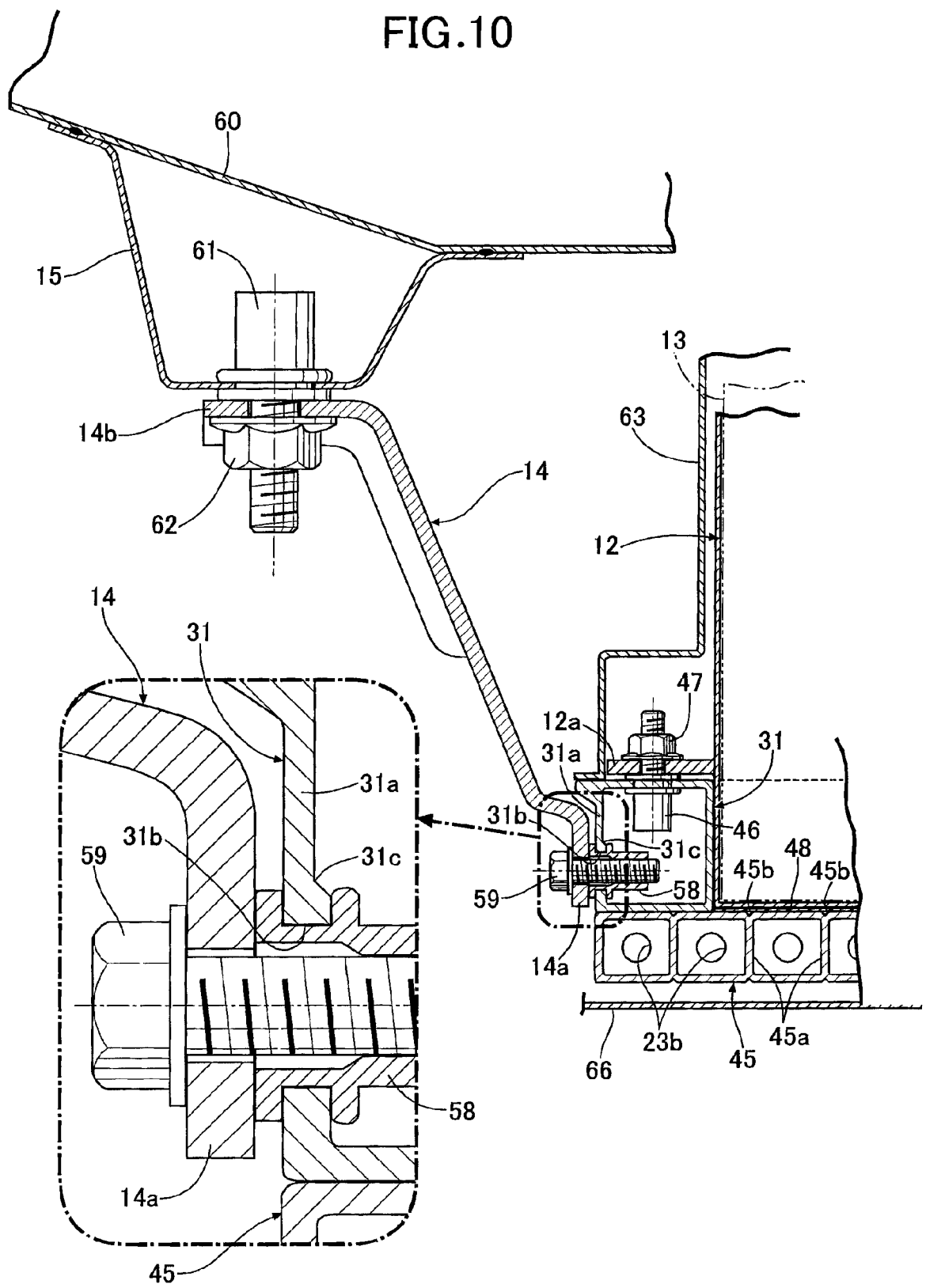
FIG. 10 is a sectional view along line 10-10 in FIG. 3. (first embodiment)

As shown in FIG. 6 and FIG. 10, the first transverse frame member 31 forming the front edge of the tray 11 has a square-shaped cross section, and three nuts 58 are fixed in advance to three openings 31b formed in the front wall 31a. A lower flange portion 14a at the lower end of the mounting bracket 14 extending obliquely downward toward the rear abuts against a front face of the first transverse frame member 31, and three bolts 59 extending through the lower flange portion 14a are secured by means of the nuts 58. A dashboard lower panel 60 disposed in a front part of the vehicle body extends downward toward the rear, and the cross member 15 extending in the vehicle width direction is joined to the lower end of the dashboard lower panel 60. An upper flange portion 14b at the upper end of the mounting bracket 14 abuts against a lower face of the cross member 15 and is secured by means of two bolts 61 and 61 and two nuts 62 and 62.

The front wall 31a of the first transverse frame member 31 includes a step portion 31c extending horizontally in an upper part of the openings 31b, the thickness of the front wall 31a being larger beneath the step portion 31c and smaller above the step portion 31c.

As shown in FIG. 1, FIG. 4 (B), and FIG. 10, with regard to a battery cover 63 covering an upper face of the battery unit of the electric automobile, its outer peripheral part is fixed to the outer periphery of the tray 11 by means of bolts 64 and nuts 65. Furthermore, a lower face of the tray 11 is covered by an under cover 66.

The operation of the mode for carrying out the present invention having the above arrangement is now explained.

When the motor/generator, which is a drive source for making the vehicle travel, is driven or regenerates, the battery modules 12, which are a power source therefor, generate heat, and to ensure durability it is necessary to cool the battery modules 12 by means of air (outside air) flowing in the interior of the tray 11. Since the battery cells 13 and the battery modules 12 are not in direct contact with outside air for cooling but are indirectly cooled by outside air flowing in the first to seventh ducts D1 to D7, the battery cells 13 and the battery modules 12 are not contaminated with dirt or moisture contained in the outside air.

When the fan unit 19 on the downstream end of the flow path for air is driven, as shown in FIG. 12, air is taken in via the intake openings 23a and 23a; 24a at the front end of the third and fourth longitudinal frame members 23 and 24. Air taken into the interior of the third duct D3 via the right-hand intake opening 23a of the third longitudinal frame member 23 flows from the right-hand face of the third duct D3 into the linking duct Dc of the heat exchange panels 45 and 45 beneath the first battery group B1, undergoes heat exchange while flowing there to thus cool the first battery group B1, then flows into the first duct D1 of the first longitudinal frame member 21, and is gathered together in the first gathering area A at the rear.

Air taken into the interior of the fourth duct D4 via the intake opening 24a of the fourth longitudinal frame member 24 flows from the left-hand face of the fourth duct D4 into the linking duct Dc of the heat exchange panels 45 and 45 beneath the second battery group B2, undergoes heat exchange while flowing there to thus cool the second battery group B2, then flows into the second duct D2 of the second longitudinal frame member 22, and is gathered together in the second gathering area B at the rear.

Air taken into the interior of the third duct D3 via the left-hand intake opening 23a of the third longitudinal frame member 23 flows from the left-hand face of the third duct D3 into the linking duct Dc of the heat exchange panels 45 beneath the third battery group B3, undergoes heat exchange while flowing there to thus cool the third battery group B3, then flows into the fifth duct D5 of the fourth longitudinal frame member 24, and is split to the front and the rear. Part of air of the fifth duct D5 passes through the opening 24d on the upper face of the fifth duct D5 and the interior of the flow path-forming member 44, flows into the bypass duct Db of the interior of the left-hand second transverse frame member 32L, flows therefrom to the front end of the second duct D2 of the second longitudinal frame member 22, and is gathered together in the first gathering area A at the rear. The rest of air of the fifth duct D5 flows to the rear, flows into the sixth duct D6 of the fourth transverse frame member 34, is split to the left and the right, and is gathered together in the first gathering area A and the second gathering area B.

Air taken into the seventh ducts D7 and D7 via the intake openings 27a and 27a at the rear end of the seventh longitudinal frame member 27 flows from the right-hand face of the right-hand seventh duct D7 into the linking duct Dc of the heat exchange panel 45 beneath the fourth battery group B4, undergoes heat exchange while flowing there to thus cool the fourth battery group B4, then flows into the eighth duct D8 of the fifth longitudinal frame member 25, flows forward, and is gathered together in the first gathering area A and also flows from the left-hand face of the left-hand seventh duct D7 into the linking duct Dc of the heat exchange panel 45 beneath the fifth battery group B5, undergoes heat exchange while flowing there to thus cool the fifth battery group B5, then flows into the ninth duct D9 of the sixth longitudinal frame member 26, flows forward, and is gathered together in the second gathering area B.

Air that has been gathered together in the first gathering area A passes through the opening 28a in the upper face of the eighth longitudinal frame member 28, flows upward in the interior of the inlet-side leg portion 42i, flows into the tenth ducts D10 in the interior of the heat exchange panel 43, undergoes heat exchange while flowing there to thus cool the sixth battery group B6, then flows downward in the interior of the outlet-side leg portion 42o, passes through the opening 29a in the upper face of the ninth longitudinal frame member 29, and is gathered together in the second gathering area B. Air flowing in the tenth ducts D10 of the interior of the heat exchange panel 43 has already undergone heat exchange with the first and fifth battery groups B1 to B5 and has been heated to some extent, but since all the air that has been gathered together in the first gathering area A flows into the tenth ducts D10, the performance in cooling the sixth battery group B6 can be ensured with air at a sufficient flow rate.

Since the silicon sheet 48 sandwiched between the battery module 12 and the heat exchange panel 45 is softer than the battery module 12 and the heat exchange panel 45, it is deformed by the weight of the battery module 12 and comes into intimate contact with both the battery module 12 and the heat exchange panel 45, thus exhibiting a function in enhancing the heat exchange efficiency from the battery module 12 to the heat exchange panel 45. Furthermore, the large number of air vent channels 45b extending parallel to each other are formed on the upper face of the heat exchange panel 45, and due to these air vent channels 45b it is possible to prevent air from being caught between the heat exchange panel 45 and the silicon sheet 48 to thus degrade the heat exchange efficiency.

The operational effect of the silicon sheet 48 sandwiched between the heat exchange panel 43 of the battery module support platform 41 and the battery modules 12 and 12, and the operational effect of the air vent channels 43b on the upper face of the heat exchange panel 43 of the battery module support platform 41 are the same as those explained above.

Air that flows in the interior of the pair of third ducts D3 and D3 formed in the third longitudinal frame member 23 so as to be in contact with each other is prior to heat exchange and has a low temperature, but among the fourth duct D4 and the fifth duct D5 formed so as to be in contact with each other in the fourth longitudinal frame member 24, air that is prior to heat exchange and has a low temperature flows into the fourth duct D4, air that has undergone heat exchange and has a high temperature flows into the fifth duct D5, heat exchange is carried out between air flows having a temperature difference, and there is a possibility that the effect in cooling the battery modules 12 of the second battery group B2 would be degraded.

However, in accordance with the present embodiment, since the fifth duct D5 communicates with the second duct D2 via the bypass duct Db, the residence time for air that has undergone heat exchange and has a high temperature in the interior of the fifth duct D5 is shortened so that it is difficult for it to undergo heat exchange with air having a low temperature within the fourth duct D4, thus minimizing the increase in temperature of air within the fourth duct D4 and minimizing degradation of the effect in cooling the second battery group B2.

Furthermore, all of the battery modules 12 except the two battery modules 12 and 12 of the third battery group supported at the front end of the tray 11 are disposed so that air for cooling flows along the lengthwise direction thereof. In other words, they are disposed so that air for cooling flows in parallel to the direction in which the battery cells 13 are stacked in the battery module 12.

Figure 13:
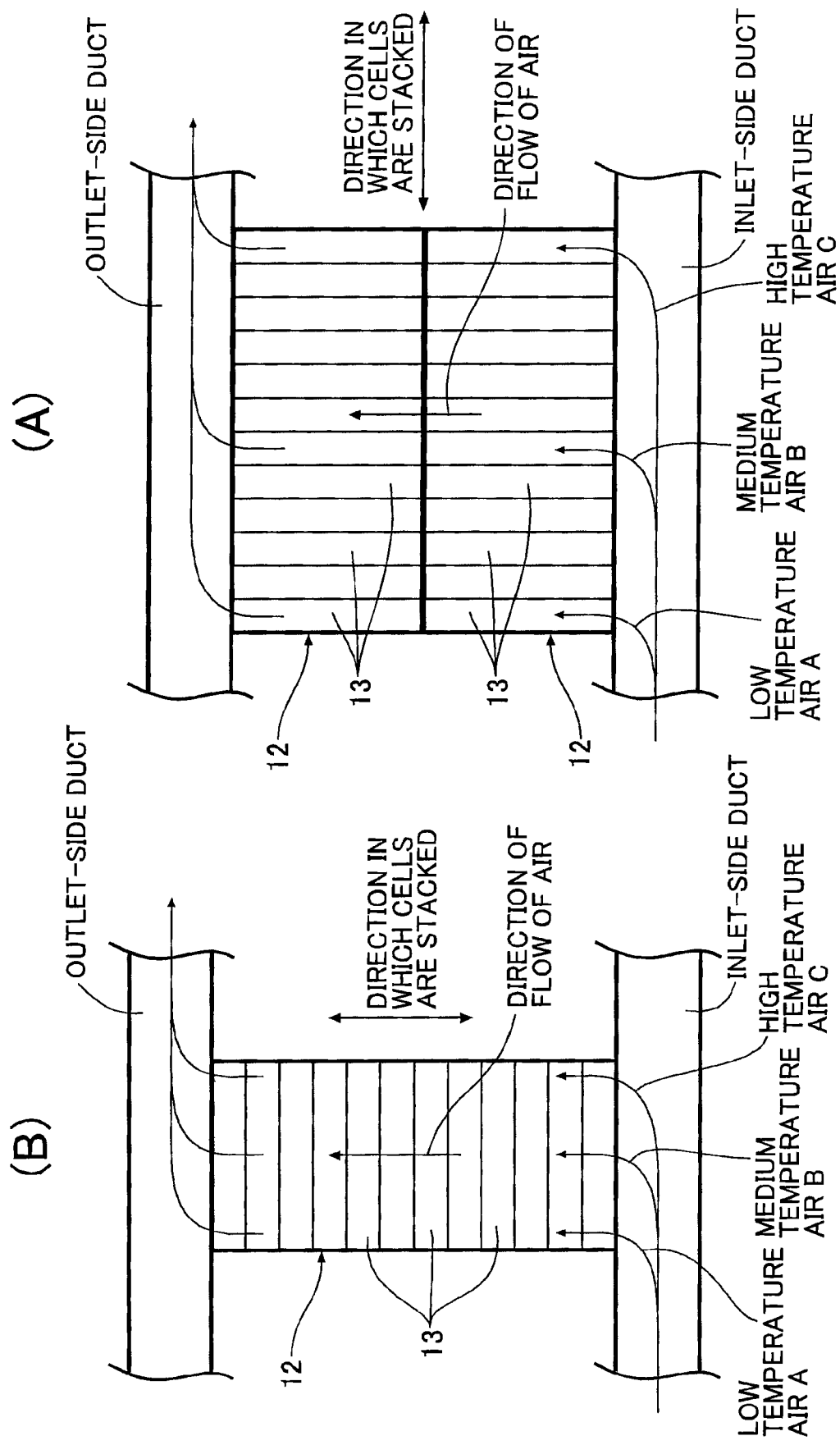
FIGS. 13A and 13B are diagram showing the relationship between the direction of flow of cooling air and the direction in which battery cells are stacked. (first embodiment)

FIG. 13 (A) shows a comparative example and corresponds to a case in which the direction in which the battery cells 13 of each battery module 12 are stacked is perpendicular to the direction of flow of air, that is, opposite to the above. In this case, the temperature of the air varies according to the position where air flows from the longitudinal frame member into the heat exchange panel; air A that changes direction on the upstream side and flows into the heat exchange panel has a low temperature, but air C that changes direction on the downstream side and flows into the heat exchange panel has a high temperature, there is a difference in the temperature of cooling air between the battery cells 13 that undergo heat exchange with air A, the battery cells 13 that undergo heat exchange with air B, and the battery cells 13 that undergo heat exchange with air C, there is a variation in temperature between the battery cells 13, and there is the problem that it becomes more difficult to cool a battery cell on the downstream side than a battery cell on the upstream side.

On the other hand, FIG. 13 (B) shows the present embodiment and corresponds to a case in which the direction in which the battery cells 13 of each battery module 12 are stacked is parallel to the direction of flow of air. In this case, all of air A having a low temperature on the upstream side, air B having a medium temperature on the midstream side, and air C having a high temperature on the downstream side contact each of the battery cells 13 and undergo heat exchange, the variation in temperature between air A, air B, and air C is equalized within each of the battery cells 13, and all of the battery cells 13 are cooled evenly, thus equalizing the difference in temperature and thereby enhancing the durability.

Furthermore, with regard to the battery module support platform 41, the two battery modules 12 having a large weight are placed on the upper face of the heat exchange panel 43 supported by the inlet-side leg portion 42i and the outlet-side leg portion 42o; when the vehicle experiences a sudden start, sudden braking, or a sudden turn, a moment that makes the battery module support platform 41 collapse by virtue of the inertial force acting on the battery modules 12 is generated. In particular, since the inlet-side leg portion 42i and the outlet-side leg portion 42o are disposed so as to be spaced in the vehicle width direction, and the width in the fore-and-aft direction is small, when the vehicle experiences a sudden start or sudden braking, the battery module support platform 41 would easily collapse in the fore-and-aft direction.

However, in accordance with the present embodiment, since the power switch support platform 51 is connected to the rear part of the battery module support platform 41, it is possible to enhance the rigidity against collapsing of the battery module support platform 41 by means of the power switch support platform 51, thus enhancing the stability at the time of sudden starting and sudden braking. In particular, with regard to the power switch support platform 51, since the mounting bracket 51e of the left-hand support leg 51b extends toward the rear of the vehicle body, the right-hand support leg 51c bends toward the front of the vehicle body, and the mounting bracket 51f extends toward the front of the vehicle body, it is possible to enhance the rigidity against collapse in the fore-and-aft direction of the power switch support platform 51 itself and consequently enhance the rigidity against collapsing in the fore-and-aft direction of the battery module support platform 41. Moreover, since the rigidity against collapsing of the battery module support platform 41 is enhanced by utilizing the power switch support platform 51, it is unnecessary to use a special reinforcing member, thus reducing the number of components and the cost.

Furthermore, since the heat exchange panel 43 of the battery module support platform 41, which is disposed above the fourth and fifth battery groups B4 and B5 as a lower layer and supports the sixth battery group B6 as an upper layer on the upper face, is formed so as to be hollow, and the sixth battery group B6 as the upper layer is cooled by means of air flowing through the tenth ducts D10 in the interior of the heat exchange panel 43, the heat exchange panel 43 has the dual function of supporting the sixth battery group B6 and cooling the sixth battery group B6, thereby reducing the number of components and simplifying the structure.

Moreover, since the interior of the heat exchange panel 43 is divided into the plurality of tenth ducts D10 by means of the plurality of partition walls 43a extending in the direction of flow of the air, not only is it possible to prevent the heat exchange panel 43 from being crushed due to the weight of the sixth battery group B6 to thus ensure a flow path for air, but it is also possible to straighten the flow of air flowing in the interior of the heat exchange panel 43 by means of the partition walls 43a to thus reduce the flow resistance. The heat exchange panels 45 supporting the first to fifth battery groups B1 to B5 can also achieve the above operational effects by means of the partition walls 45a in the same manner as for the heat exchange panel 43 supporting the sixth battery group B6.

When water builds up on the floor face of the tray 11 due to condensation or infiltration, there is a possibility that the water could make the battery modules 12 wet and degrade the durability, but water that has built up on the upper face of the heat exchange panels 45 forming the floor face of the tray 11 flows from the drain holes 23c and drain holes 24c formed in the third and fourth longitudinal frame members 23 and 24 (see FIG. 9) to the interior of the hollow frames F and F and is discharged therefrom to the lower face of the tray 11 via the drain pipes 57 and 57 extending vertically through the third and fourth ducts D3 and D4, and it is therefore possible to prevent the battery modules 12 from deteriorating due to deposited water. Furthermore, since a labyrinth is formed from the drain pipes 57 and 57, the hollow frames F and F, the drain holes 23c, and the drain holes 24c, not only is it possible to prevent water from entering the tray 11 side from the drain pipes 57 and 57 side, but it is also possible to prevent any increase in the number of components or complication of the structure since the third and fourth longitudinal frame members 23 and 24 are utilized for discharging water.

Furthermore, since the third to fifth ducts D3 to D5 are formed integrally with the lower faces of the hollow frames F and F of the third and fourth longitudinal frame members 23 and 24, not only is it possible to further enhance the rigidity of the tray 11 by reinforcing the hollow frames F and F by means of the third to fifth ducts D3 to D5, but it is also possible to enhance the rigidity of the third and fourth ducts D3 and D4 against a load in the vertical direction by means of the drain pipes 57 and 57 since the drain pipes 57 and 57 extend through the third and fourth ducts D3 and D4 from top to bottom.

Moreover, since the drain pipes 57 and 57 are positioned in the end parts of the third and fourth ducts D3 and D4 on the downstream side in the direction of flow of air, it is possible to minimize the disturbance by the drain pipes 57 and 57 in the flow of air within the third and fourth ducts D3 and D4. Even if the drain pipes 57 and 57 are provided only at the rear end of the third and fourth ducts D3 and D4, since water within the third and fourth ducts D3 and D4 flows rearward due to inertia when the vehicle starts or accelerates, discharge of water is carried out without a problem.

Furthermore, since the lower ends of the drain pipes 57 and 57 open so as to oppose the upper face of the under cover 66 covering the lower face of the tray 11, muddy water, etc. splashed up by a wheel accompanying travel of the vehicle can be blocked by the under cover 66 and prevented from entering the interior of the third and fourth ducts D3 and D4 via the drain pipes 57 and 57.

The drain structure provided in the third and fourth longitudinal frame members 23 and 24 in order to prevent the first to third battery groups B1 to B3 from getting wet is explained above, and in order to prevent the fourth and fifth battery groups B4 and B5 from getting wet the same drain structure may be provided in the seventh longitudinal frame member 27.

Figure 11:
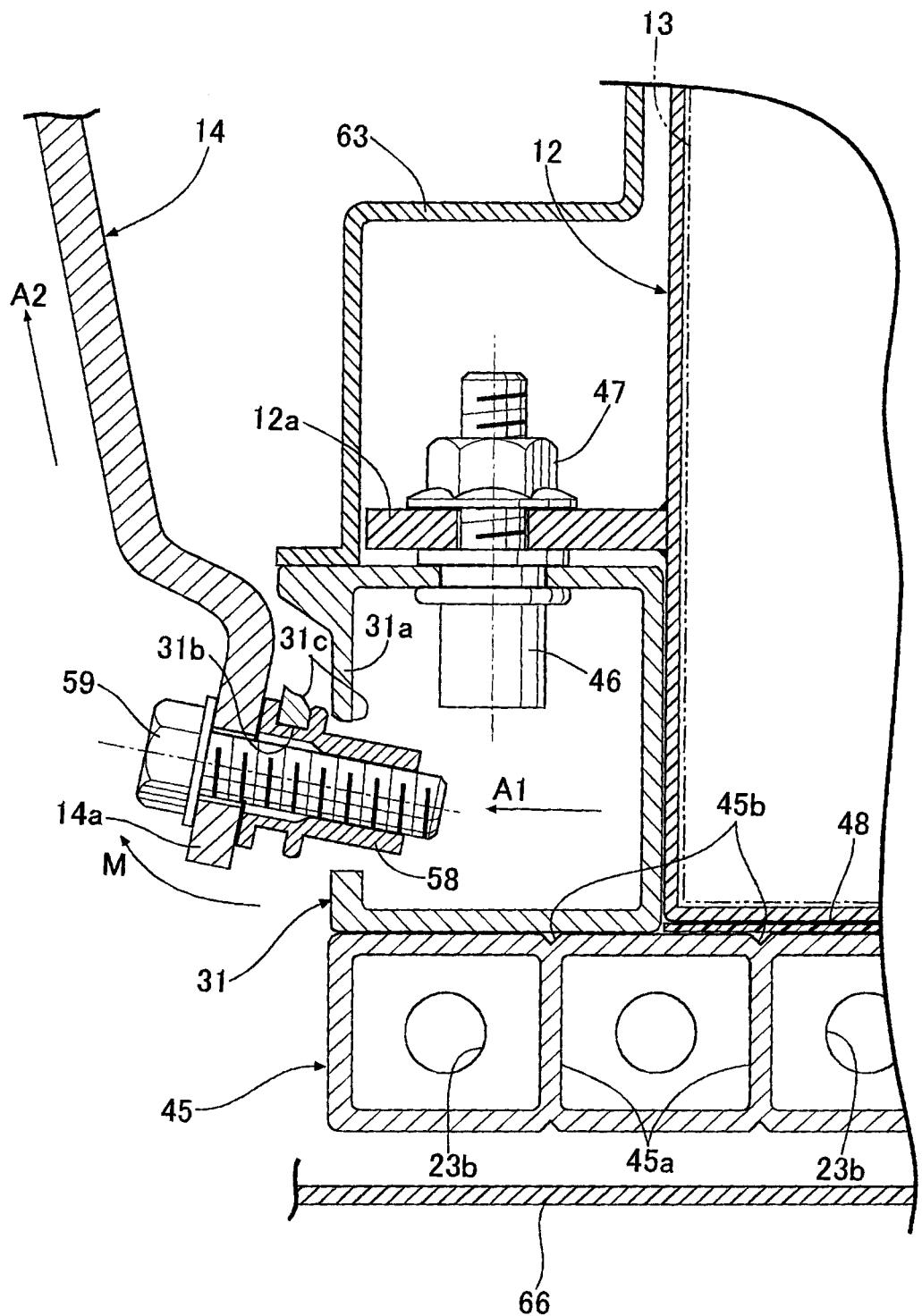
FIG. 11 is a diagram, corresponding to FIG. 10, for explaining the operation. (first embodiment)

As shown in FIG. 11, when the vehicle is involved in a front collision, since the battery unit having a large weight moves forward due to inertial force (see arrow A1), and the dashboard lower panel 60, the cross member 15, and the mounting bracket 14 are deformed so as to be pulled upward by crumpling of the front part of the vehicle body (see arrow A2), a large bending moment M acts on the mounting bracket 14 having the upper end fixed to the cross member 15 and the lower end fixed to the first transverse frame member 31 of the tray 11. During this process, since the step portion 31c, whose strength suddenly changes, is formed on the front wall 31a of the first transverse frame member 31, to which the lower flange portion 14a of the mounting bracket 14 is joined by means of the bolts 59 and the nuts 58, due to a portion of the step portion 31c being broken by the bending moment M, the nuts 58 become detached from the first transverse frame member 31, and the front end of the tray 11 is severed from the mounting bracket 14.

When the front end of the tray 11 is severed from the mounting bracket 14 in this way, displacement of the tray 11 having its rear part suspendingly supported on the side frames 18L and 18R by the mounting brackets 16L and 16R; 17L and 17R can be separated from deformation of the vehicle body member. As a result, it is possible to prevent the occurrence of any inconvenient event in terms of electrical safety such as deformation of the battery unit or a surrounding high voltage power distribution system due to application of stress caused by pulling as a result of deformation of the vehicle body front part or a ground fault due to being pushed by the vehicle body member positioned above.

Even when the vehicle is running normally, the battery unit will receive an inertial force in the fore-and-aft or left-and-right direction or the vertical direction due to sudden starting, sudden braking, sudden turning, driving over irregularities on the road surface, etc., and in this case there is no deformation of the dashboard lower panel 60 toward the upper rear (see arrow A2) a bending moment M does not occur, and the step portion 31c therefore does not break.

A mode for carrying out the present invention is explained above, but the present invention may be modified in a variety of ways as long as the modifications do not depart from the spirit and scope thereof.

For example, the electronic component of the present invention is not limited to the power switch 52 of the embodiment.

The invention claimed is:

1. A battery cooling structure, comprising:
a lower layer battery group which is placed on a tray,
a battery support member disposed above the lower layer battery group, and
an upper layer battery group supported on an upper face of the battery support member,
wherein the lower layer battery group and the upper layer battery group are cooled by the flow of a cooling medium,
wherein the battery support member is formed to provide a bridge between a first leg portion and a second leg portion which are standingly provided on the tray with a distance therebetween, the battery support member and the first and second leg portions being hollow, and
wherein the upper layer battery group is cooled by a cooling medium that flows in an interior of the battery support member and the first and second leg portions.

2. The battery cooling structure according to claim 1, wherein the interior of the battery support member is divided into a plurality of flow paths by a partition wall extending in the direction of flow of the cooling medium.

3. The battery cooling structure according to claim 1, further comprising an electronic component support member disposed adjacent to the battery support member,
wherein the electronic component support member comprises a support part that supports an electronic component and a support leg that extends downward from the support part and is fixed to a fixing part, and
wherein the support part is fixed to the battery support member.

4. The battery cooling structure according to claim 3,
wherein the support leg is provided on one end side and the other end side, in a vehicle width direction, of the electronic component support member,
wherein a first mounting bracket is provided at an end of the support leg which is fixed to the fixing part on said one end side in the vehicle width direction, the first mounting bracket extending toward a front of a vehicle body, and
wherein a second mounting bracket is provided at an end of the support leg which is fixed to the fixing part on said other end side in the vehicle width direction, the second mounting bracket extending toward a rear of the vehicle body.

5. The battery cooling structure according to claim 4, wherein the support leg on said one end side in the vehicle width direction has a lower part thereof bending toward the front of the vehicle body relative to an upper part thereof.

6. The battery cooling structure according to claim 2, further comprising an electronic component support member disposed adjacent to the battery support member,
   wherein the electronic component support member comprises a support part that supports an electronic component and a support leg that extends downward from the support part and is fixed to a fixing part, and
   wherein the support part is fixed to the battery support member.

7. The battery cooling structure according to claim 6,
   wherein the support leg is provided on one end side and the other end side, in a vehicle width direction, of the electronic component support member,
   wherein a first mounting bracket is provided at an end of the support leg which is fixed to the fixing part on said one end side in the vehicle width direction, the first mounting bracket extending toward a front of a vehicle body, and
   wherein a second mounting bracket is provided at an end of the support leg which is fixed to the fixing part on said other end side in the vehicle width direction, the second mounting bracket extending toward a rear of the vehicle body.

8. The battery cooling structure according to claim 7, wherein the support leg on said one end side in the vehicle width direction has a lower part thereof bending toward the front of the vehicle body relative to an upper part thereof.

9. The battery cooling structure according to claim 1, wherein the cooling medium flows from an interior of the tray upwardly through an interior of one of the first and second leg portions, then flows through the interior of the battery support member while cooling the upper layer battery group and thereafter flows downwardly through an interior of the other of the first and second leg portions and returns to the interior of the tray.

* * * * *